United States Patent [19]

Oku

[11] Patent Number: 5,276,080
[45] Date of Patent: * Jan. 4, 1994

[54] STATIC DISSIPATIVE RESIN COMPOSITION

[75] Inventor: Mitsumasa Oku, Osaka, Japan

[73] Assignee: Matsushita Electric Industrial Co., Ltd., Osaka, Japan

[*] Notice: The portion of the term of this patent subsequent to Aug. 25, 2009 has been disclaimed.

[21] Appl. No.: 846,924

[22] Filed: Mar. 5, 1992

[30] Foreign Application Priority Data

| Mar. 5, 1991 | [JP] | Japan | 3-037678 |
| Feb. 4, 1992 | [JP] | Japan | 4-054388 |
| Feb. 7, 1992 | [JP] | Japan | 4-056778 |

[51] Int. Cl.$^5$ ............................................. C08K 3/22
[52] U.S. Cl. .................................. 524/432; 524/912; 524/439; 524/440; 524/520; 524/513; 524/514; 524/528; 524/406; 524/424
[58] Field of Search ............... 524/432, 439, 440, 912, 524/432, 912

[56] References Cited

U.S. PATENT DOCUMENTS

| 4,373,013 | 2/1983 | Yoshizumi | 428/570 |
| 4,680,225 | 7/1987 | Ogawa et al. | 428/323 |
| 4,880,703 | 11/1989 | Sakamoto et al. | 428/378 |
| 5,034,447 | 7/1991 | Izumida et al. | 524/432 |
| 5,071,593 | 12/1991 | Takahashi et al. | 252/500 |
| 5,087,654 | 2/1992 | Harada et al. | 524/432 |
| 5,116,666 | 5/1992 | Konno | 428/220 |
| 5,141,982 | 8/1992 | Oku et al. | 524/432 |

OTHER PUBLICATIONS

Webster's Ninth New Collegiate Dictionary, ©1990 p. 1344.

Primary Examiner—Joseph L. Schofer
Assistant Examiner—Mark Nagumo
Attorney, Agent, or Firm—Wenderoth, Lind & Ponack

[57] ABSTRACT

In the static dissipative resin composition of the present invention, fundamentally, at least semiconductor fillers are dispersed in a resin and at least a part of the semiconductor fillers are brought into electrical contact with each other, thereby forming a conductive path. The $\alpha$ value representing the degree of the nonlinearity of the V-i characteristics at the contact between the semiconductor fillers should be 2–150, and the volume resistivity of the semiconductor filler is desirably $10^5$–$10^{10}\Omega$.cm, whereby on the employment of a conductive filler or a solid lubricant together with the semiconductor filler, various physical properties of the resin composition are improved.

17 Claims, 5 Drawing Sheets

10μm

STATIC DISSIPATIVE RESIN COMPOSITION

BACKGROUND OF THE INVENTION

1. Field of the Invention

The present invention generally relates to a static dissipative resin composition, and more particularly, to a resin composition having the resistivity (surface resistivity $1.0 \times 10^5 - 1.0 \times 10^{12} \Omega/\square$) defined as the static dissipative property according to the U.S. standard ANSI/EIA-541-1988, or a resin composition having the resistivity (surface resistivity $1.0 \times 10^5 - 1.0 \times 10^9 \Omega/\square$) defined as the static dissipative property according to the U.S. standard DOD-HOBK-263.

The resin composition of the present invention is used in the form of pellets or powders as a resin compound for injection molding or extrusion molding, etc. and is also offered as a final molded product like a part, a plate, a sheet, a film, etc. Moreover, the resin composition may be offerred as a paint, coating paste or putty or a coated film.

For examples of the aforementioned molded final product, there are wall or floor materials (floor tile, floor surfacing and the like), antistatic packaging products for semiconductors (e.g., IC trays, IC magazines, IC carrier tapes, boxes, containers, cabinets, substrate holders, printed board stands and the like), and the other antistatic products, earthing products and sliding parts or the like in the OA, AV, FA fields such as computers, copying machines, facsimiles, printers, VTRs, video cassette tapes, compact disk recorders, etc. More specifically, tape guides and guide rollers for the tapes of the AV devices can be manufactured of the resin composition, and such sliding parts as bearings and gears are formed of the resin composition of the present invention. Likewise, the resin composition is useful not only for the components of liquid crystal displays, particularly, TFT liquid crystal displays, but for the supporting or holding members in the manufacturing process of the displays. The resin composition may be employed to coat the floor and equipments in a clean room.

2. Description of the Prior Art

Resin has been widely employed as a material having a superior insulation property (for instance, $10^{15} \Omega/\square$ or higher).

In recent years, however, the static electricity generated from the insulative resin has been noticed as a problem of the semiconductors, OA or FA devices, and accordingly a resinous material with static dissipative properties ($10^5 - 10^{12}$ or $10^5 - 10^9 \Omega/\square$) has attracted people's enthusiastic attention. Although a highly conductive resin (smaller than $10^5 \Omega/\square$) is effective to some degree so long as the prevention of static build-up and static electricity are concerned, it is an imperfect resin since, because of the highly conductive properties thereof (smaller than $10^5 \Omega/\square$), a discharge spark is brought about by the static electricity or a short-circuiting occurs with the general use electricity.

The static dissipative material has a proper resistance by itself, and therefore the static electricity, if it is generated, can be easily and promptly let outside, without accompanying discharge spark. In addition, the static dissipative material has little possibilities for an electric shock or short-circuiting in a general electric circuit, etc. In other words, the static dissipative material is regarded as "statically conductive and electrically insulative".

Therefore, various developments have targeted a superior static dissipative material, but a fully satisfactory result has not been achieved yet.

For instance, conventionally, an organic and ionic antistatic agent has been mixed into ABS resin or the like. But this resinous material is strongly dependent on humidity, and it hardly functions in the highly dried condition. Even worse, the antistatic agent may ooze out of the surface of the resin with time, and only a relatively high resistance (e.g., ($10^{10} - 10^{12}$ $\Omega/\square$) is achieved by this resinous material. The resinous material of this kind is therefore instable. Moreover, this method is applicable to a limited kind of resins.

On the other hand, an inorganic conductive filler having more stable characteristics than the above-described antistatic agent has been mixed in some of the resinous materials.

In general, the following has been known about the resinous material of this type. When the conductive filler is mixed into a resin thereby to turn the resin conductive, the phenomenon in this case is often explained by the "Percolation Theory". The relation between the mixing amount (wt. %) of the filler and resistance of the resinous material is schematically represented in a diagram of FIG. 1. More specifically, as the conductive filler is mixed, the resinous material is initially in the originally insulative state (area (I)). When the mixing amount exceeds a certain level, a slight conductivity appears immediately (although the conductivity is instable) (area (II)). Even if the mixing amount of the filler is increased over the certain level, the conductivity Rs is not changed so much, that is, it enters a stable area (III). Therefore, a stable conductive resinous composition is designed in the area (III).

Meanwhile, a stable point Rso of the conductivity of the resinous composition is greatly dependent on the conductivity of the conductive filler. Rso becomes not higher than $10^{-1} \Omega/\square$ in the case of a metallic conductive filler; and also becomes ($10^0 - 10^4 \Omega/\square$ in the case of carbon filler.

As is apparent from FIG. 1, although it is not impossible to obtain the resinous material having the static dissipative level which exists between insulation level and Rso, in the middle of the insulation properties if the resinous material is designed in the area (II), the resultant resinous material is instable in conductivity with poor reproducibility.

As such, in order to obtain especially a static dissipative resinous composition, such a conductive filler that has the conductivity to bring the stable point Rso in the static dissipative level is desirable and strongly recommended. However, as mentioned before, the stable point Rso is too low in the case of conventional inorganic conductive fillers (either metallic or carbon filler) to be used for the static dissipative resin composition. If those conductive fillers are nevertheless used and the static dissipative resin compositions are designed in the area (II), the resin compositions are turned instable in conductivity and poor in reproducibility.

In the meantime, Japanese Patent Laid-Open Publication No. 1-225663 (225663/1989) reveals a resin composition with high conductivity (the $10\Omega.cm$ mark) having highly conductive zinc oxide whiskers mixed into a resin. This prior art is also disadvantageous in its extraordinary low Rso and is unable to achieve the stable static dissipative level, similar to the above-described resinous composition having the inorganic conductive filler mixed therein.

SUMMARY OF THE INVENTION

An essential object of the present invention is therefore to provide a resin composition having an inorganic conductive filler mixed and with a stable point of conductivity Rso in the static dissipative level.

A further object of the present invention is to provide a static dissipative resin composition with stable conductivity and less dependency on humidity without causing oozing of a conductive agent.

A still further object of the present invention is to provide a static dissipative resin composition enabling a change of a variety of resins such as a crystalline thermoplastic resin into a matrix.

A yet further object of the present invention is to provide a white static dissipative resin composition which is highly useful in practical use and suitable to be colored in various tints, and having superior moldability for injection molding and less abrasion of a molding press or mold.

A still important object of the present invention is to provide a highly efficient static dissipative resin composition which makes it easier to leak static electricity, while being more insulative against general electricity.

In order to achieve the aforementioned objects, the inventors of the present invention have come up with various ideas to devise a remarkably superior static dissipative resin composition with the following features.

According to a first invention, a static dissipative resin composition has at least semiconductor fillers dispersed in a resin, wherein a conductive path is formed at least through an electrical contact among at least a part of the semiconductor fillers. The value indicating the nonlinearity of the V-i characteristics through the contact of the semiconductor fillers is 2-150. The volume resistivity of the semiconductor filler is desirably $10^5$–$10^{10} \Omega.cm$, and the semiconductor filler is preferably a semiconductor whisker, particularly, a zinc oxide whisker having an aspect ratio not smaller than 3.

According to a second invention, a static dissipative resin composition has at least zinc oxide whiskers having the aspect ratio not smaller than 3 and the volume resistivity $10^5$–$10^{10} \Omega.cm$ dispersed in a resin, wherein a conductive path is formed at least through an electrical contact among at least a part of the zinc oxide whiskers. The $\alpha$ value indicating the nonlinearity of the V-i characteristics through the contact of the zinc oxide whiskers is desirably 2-150.

According to a third invention, a static dissipative resin composition has at least zinc oxide whiskers having the aspect ratio not smaller than 3, the volume resistivity $10^5$– $10^{10} \Omega.cm$ and the $\alpha$ value 2-150 and at least one other kind of conductive filler dispersed in a resin, wherein a conductive path is formed at least through an electrical contact among at least a part of the zinc oxide whiskers, zinc oxide whiskers and conductive fillers, or conductive fillers. The conductive filler may be a particle, flake, whisker or fiber of metal, carbon or graphite, or a particle, whisker or fiber of ceramics. At this time, the mixing ratio of the sum of the zinc oxide whiskers and conductive fillers is desirably 5-80wt. % to the whole of the resin composition, and the weight ratio of the zinc oxide whiskers and conductive fillers is desirably between 1:50 and 50:1.

According to a fourth invention, a static dissipative resin composition has at least zinc oxide whiskers having the aspect ratio not smaller than 3, the volume resistivity $10^5$–$10^{10} \Omega.cm$ and the $\alpha$ value 2-150 and at least one kind of a solid lubricant dispersed in a resin, wherein a conductive path is formed at least through an electrical contact among a part of the zinc oxide whiskers. The solid lubricant may be a powder molding material selected from polytetrafluoroethylene, high density polyethylene, aromatic polyamide, aromatic polyester, granular phenol and its graphitized substance, graphite, molybdenum disulfide, tungsten disulfide, $WSe_2$, $MoSe_2$, boron nitride, etc. The mixing ratio of the solid lubricant is desirably 1-30wt. % to the whole of the resin composition, and that of the zinc oxide whiskers is desirably 20-80wt. % to the whole of the resin composition.

According to a fifth invention, a static dissipative resin composition has at least zinc oxide whiskers having the aspect ratio not smaller than 3, the volume resistivity $10^5$–$10^{10}\Omega.cm$ and the $\alpha$ value 2-150, the other kind of conductive filler and one kind of a solid lubricant dispersed in a resin, so that a conductive path is formed at least through an electrical contact among at least a part of the zinc oxide whiskers, zinc oxide whiskers and conductive fillers, or conductive fillers.

As described hereinabove, according to the present invention, an electricity conducting path is achieved totally or partly through semiconductor fillers. Owing to the combined effects of the proper specific resistance of the semiconductor filler and the nonlinear characteristics at the boundary between two semiconductor fillers or between a semiconductor filler and a conductive filler, the conductivity of the resin composition is rendered superbly suitable as a static dissipative material.

For example, one such semiconductor filler is selected in the present invention that assumes the conductivity of strongly nonlinear characteristics at the boundary therebetween as indicated in FIG. 2. At the same time, the conductivity (volume resistivity) of the semiconductor filler itself is properly selected. Accordingly, the present invention provides a greatly efficient static dissipative material as compared with the conventional one.

In other words, the conductivity at the boundary where the semiconductor fillers are in touch with each other has a strong dependency on voltage (field dependency), i.e., resistivity is high at a low voltage (low electric field), while representing a low resistivity steeply at a high voltage (high electric field). That is, the conductivity at the boundary works a higher resistance (insulative) to the electricity in general use (low electric field), thereby ensuring a further insulating efficiency of the resin composition. On the other hand, the conductivity at the boundary shows a lower resistance against the static electricity which is usually of a superhigh voltage (high electric field), whereby the static electricity can easy escape. The resin composition of the present invention features the two opposite functions as above (low voltage-high resistance and high voltage-low resistance).

Moreover, the conduction mechanism of the semiconductor filler of the present invention, particularly, zinc oxide whisker, is electronic, and therefore less influenced by humidity (although the conductivity of a resin composition with an ionic conduction mechanism is strongly influenced by humidity). Accordingly, the present invention achieves stable conductivity thereby to perform effective dissipation of the static electricity.

As shown in FIG. 3, since the stable point Rso of the conductivity of the resin composition of the present invention is properly set in the static dissipative level, the static dissipative resin composition is considerably stable.

The semiconductor filler, particularly, zinc oxide whisker, used in the present invention is white and is a relatively soft ceramics filler with Morhs hardness 4. Therefore, the resulting resin composition can be colored in various tints. The abrasion of the molding press or mold is eliminated.

Although the zinc oxide whiskers give resin compositions with naturally good sliding properties, if a solid lubricant of various kinds is added thereto, the abrasion resistance and sliding properties of the static dissipative resin composition become more increased.

The present invention is applicable in a wide range of resins, namely, from a thermoplastic resin to a thermosetting resin, and therefore is highly useful. A thermoplastic resin is particularly fit, and a crystalline resin among them presents a favorable result.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
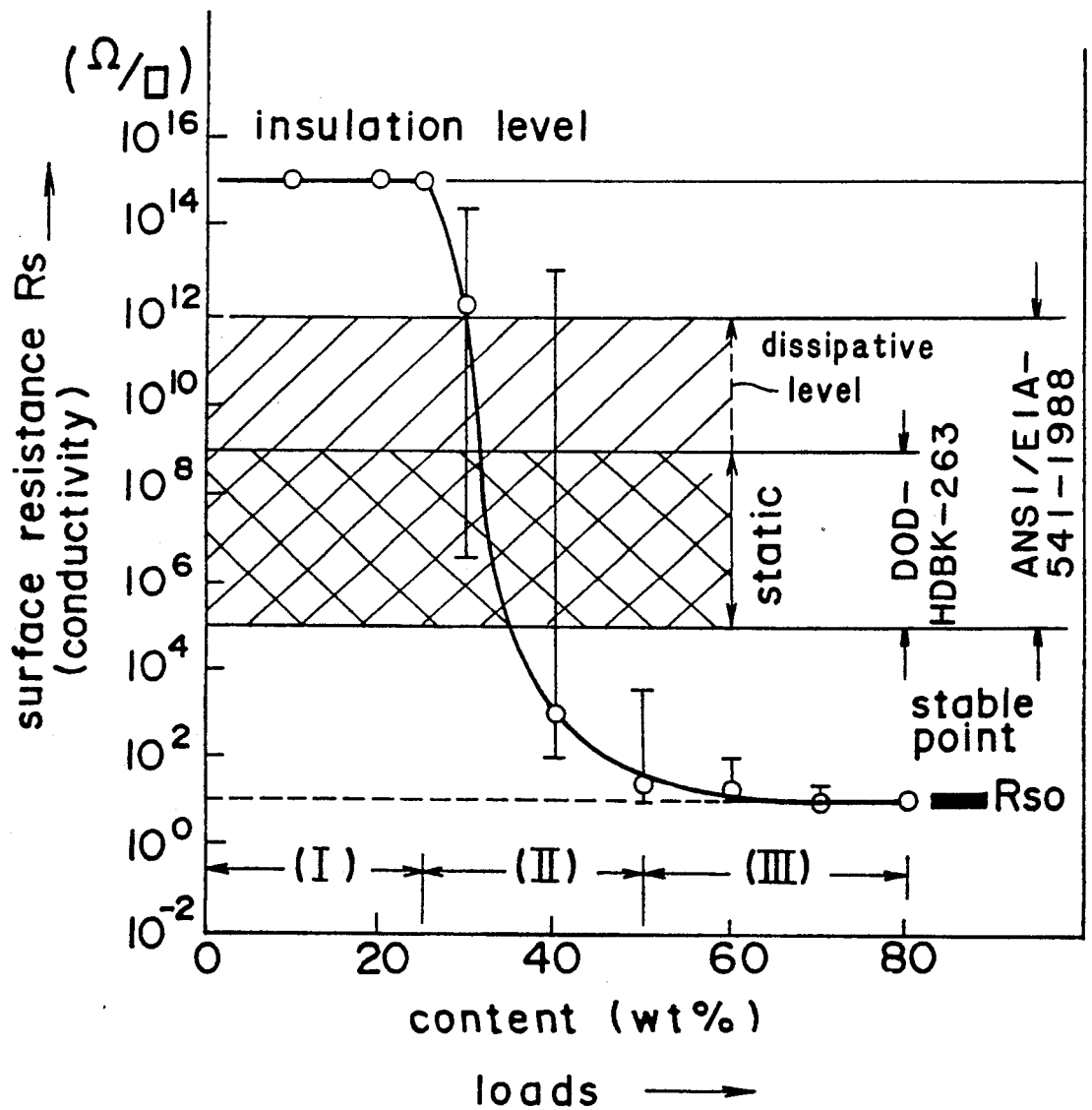
FIG. 1 is a diagram of the characteristic curve of a prior art composition.

The present invention will be depicted hereinbelow in conjunction with preferred embodiments thereof.

A semiconductor filler having the $\alpha$ value 2-150 or specific volume resistance $10^5$-$10^{10}\Omega$.cm is employed. Concretely speaking, a semiconductor filler of zinc oxide, barium titanate, selenium, silicon, silicon carbide, etc. which is a main component of a varistor, a semiconductor filler of metallic oxide such as $SnO_2$, $TiO_2$, $GeO_2$, $Cu_2O$, $Ag_2O$, $In_2O_3$, $Tl_2O_3$, $SrTiO_3$, $LaCrO_3$, $WO_3$, $EuO$, $Al_2O_3$, $PbCrO_4$, etc. or $InP$ is mixed in a resin. A single kind or two or more kinds of the above fillers may be blended with a suitable mixing ratio.

Although the shape of the semiconductor filler is not specifically determined and the filler may be granules, whiskers, flakes or formed in a mass, it is desirable to use semiconductor fillers of whiskers, fibers, or flakes, particularly, tetrapod-like whiskers in order to facilitate the formation of a conducting path in the resin.

A semiconductor filler of a single crystal is most suitable, but the single crystal of the semiconductor filler may be crushed or the semiconductor filler of fine particles may be used. Besides, a semiconductor filler of a sintered body or a sintered body after being crushed or turned into fine particles may be used.

Further, it is possible to make semiconductor fine particles held on the other filler material, e.g., conductive or insulating whiskers, flakes, or fibers thereby to produce a semiconductor filler (by means of coating and the like).

Regarding the size or dimension of the semiconductor filler, it is naturally set in a proper range so that the semiconductor filler is dispersed in the resin to turn the resin conductive. Specifically, the maximum length of the filler is selected from 10 mm–0.01 $\mu$m, more suitably from 300 $\mu$m–1 $\mu$m to 300 $\mu$m–3 $\mu$m, and preferably from 200 $\mu$m–10 $\mu$m. 50 $\mu$m–10 $\mu$m is best. If the maximum length is smaller than 0.01 $\mu$m, $\alpha$ value is difficult to be properly set. If it exceeds 10 mm, the filler is hard to be uniformly dispersed in the resin.

When the aspect ratio (maximum length/minimum length) of the semiconductor filler in the form of whiskers, fibers and flakes is 3–10000 or approximately 3–1000, it is effective and efficient to form the conducting path. Particularly, 5–50 is most suitable.

According to the present invention, the specific volume resistance of the semiconductor filler is $10^5$–$10^{10}\Omega$.cm, especially $10^6$–$10^{10}\Omega$.cm. The semiconductor filler with $10^7$–$10^9\Omega$.cm specific volume resistance is more preferable to realize the static dissipative resin composition of the present invention. The resistance of the semiconductor filler is controlled in such an adequate manner as oxidization, reduction or control of valences. It is not forbidden to add a suitable amount of impurity elements therefor.

The specific volume resistance of the semiconductor filler is measured in a manner as will be described below. In the first place, the semiconductor filler to be measured is collected in an amount of 0.5 g and inserted to be held uniformly between a pair of parallel plate electrodes (silver-plated electrodes) of 20 mm diameter, to which 5 kg/cm$^2$ is uniformly impressed. Then, the resistance between the pair of the electrodes is measured by means of a superinsulating resistance meter (High Resistance Meter 4329A by HP Inc.). The value of the meter 5 seconds after the application of the pressure is read (measuring voltage 25 V). Subsequently, a pressured powdery sample of the semiconductor filler is taken out, and the thickness of the sample is measured. The volume resistivity P is calculated from the thickness of the sample, area of the sample (3.14 cm$^2$) and the above-measured resistance in accordance with the following formula:

$$P(\Omega.cm) = R.S/t$$

wherein R($\Omega$) is a resistance, S(cm$^2$) is the area of the sample, t(cm) is the thickness of the sample and P($\Omega$.cm) is the volume resistivity. The measurement is performed at 20° C. with the humidity 40% RH.

The $\alpha$ value indicative of the nonlinear voltagecurrent characteristic (V-i characteristic) generated consequent to the contact between the semiconductor fillers should be 2–150. 2–100 and particularly 2.5–40 is desirable to obtain a good static dissipative resin composition. 3–15 is further suitable from the manufacturing viewpoint. Although the semiconductor filler with the $\alpha$ value smaller than 2 may be possibly used to prepare a static dissipative resin composition, the obtained resin composition does not show such a static dissipative property as in the present invention. Meanwhile, if the $\alpha$ value is over 150, a discharge spark of the static electricity is disadvantageously brought about.

Figure 2:
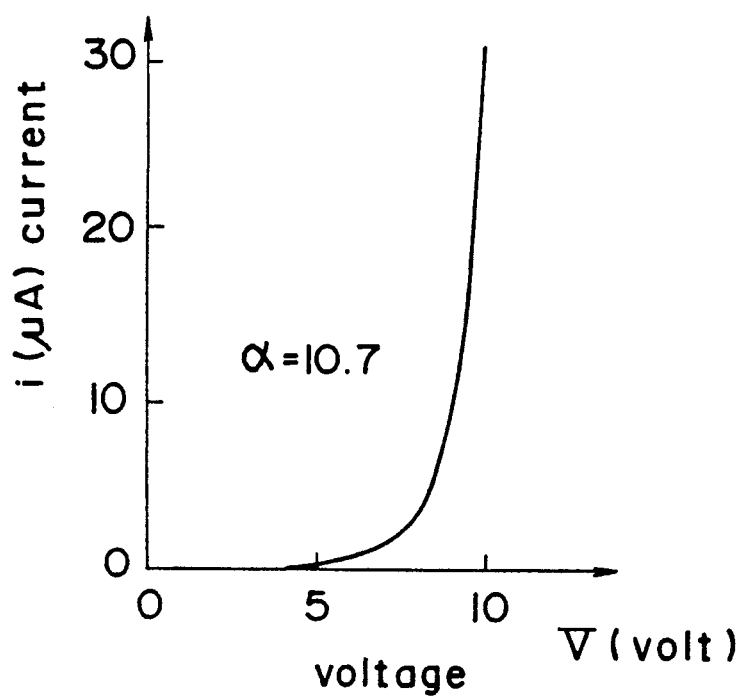
FIG. 2 is a diagram of the nonlinear characteristic curve of ZnO whiskers used in the present invention.
Figure 3:
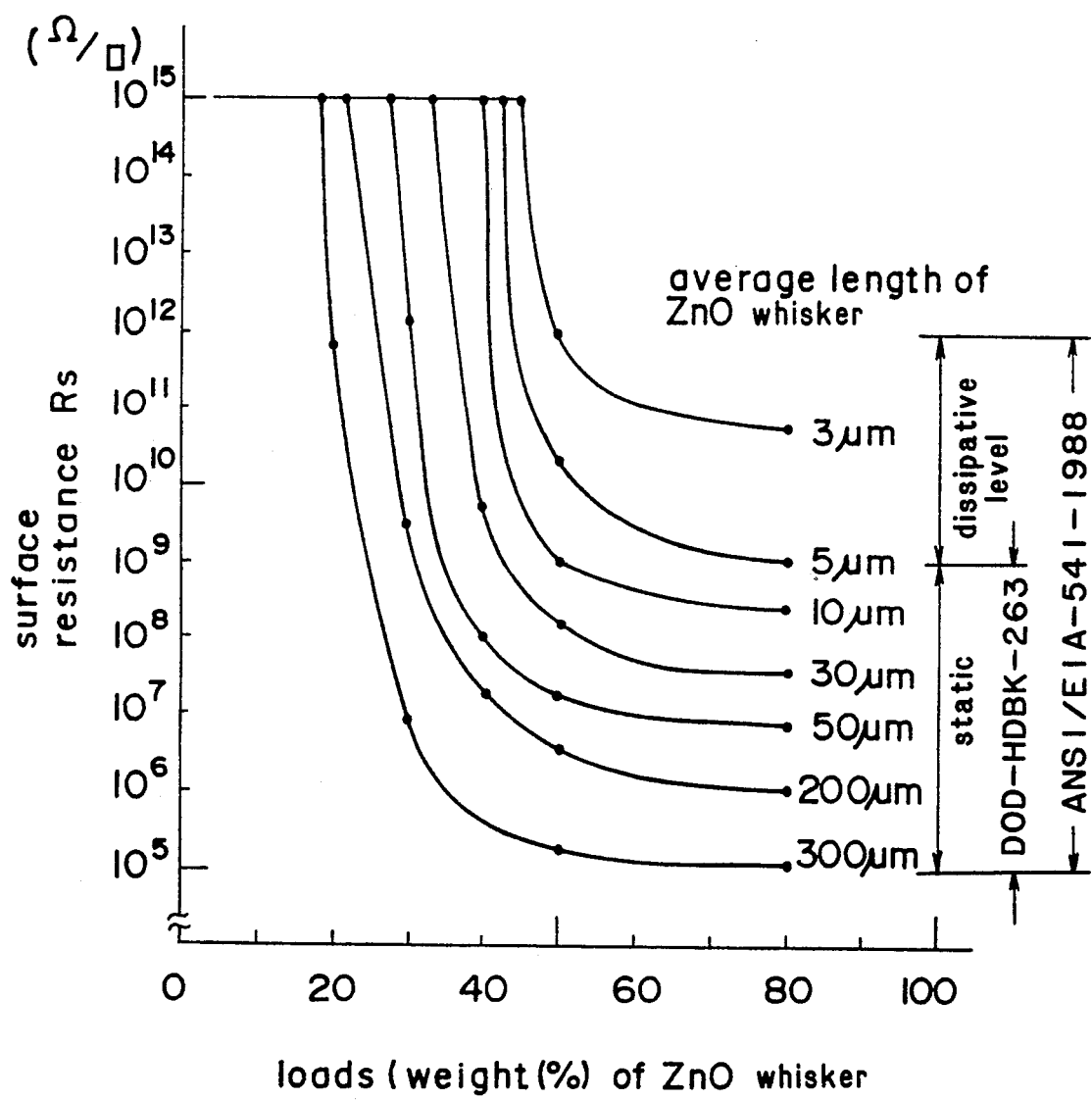
FIG. 3 is a diagram of the relation between the surface resistance and loadings of ZnO whisker in the present invention.

In order to measure the α value, the semiconductor fillers are brought into touch with each other, and a lead wire is taken out from both ends. By way of example, two monofilaments of zinc oxide whisker (abbreviated as ZnO whisker hereinafter) (in the shape of a needle, 50 mm long) are placed to intersect in contact with each other, and a lead wire (using a silver paint and a gold wire) is led out from each monofilament. The V-i characteristics at this time are indicated in FIG. 2. There is another measuring method, by which a current is measured by changing the voltage with use of the parallel plate electrodes and the sample employed for measuring the volume resistivity discussed before. This method is simple and makes it easy to evaluate the results. The voltage is increased gradually from a low voltage. In this case, it is important to monitor carefully the nonlinearity of the V-i characteristics. Moreover, in the case where the current read is unstable at each voltage, the value 5 seconds after applying of the voltage should be read. The optimum α value for the area where the V-i characteristics are changed nonlinearly is obtained according to an equation:

$$i = a(V-b)^\alpha + c$$

wherein a, b, c are constants. In this case, the least square or computing is quite useful.

In the meantime, as a physical phenomenon causing nonlinearity from the contact between the semiconductor fillers, there is a tendency of not complying with Ohm's law at the boundary due to the surface level or PN junction, Zener effect, etc.

The loadings of the semiconductor filler into the resin cannot be specifically defined since it depends on the kind of the filler. However, 20-80 weight % to the whole of the resin composition is suitable, and 30-70 weight % is more suitable. When it is smaller than 20 weight %, the conducting path is not perfectly formed, whereby the conductivity is insufficient for dissipation of the static electricity. In contrast, if the semiconductor filler is mixed over 80 weight %, the resin composition becomes undesirably fragile or brittle.

A semiconductor whisker is fit for the semiconductor filler in the present invention, which is formed of, for example, ZnO, silicon carbide, $SnO_2$, ZnS, silicon, or germanium. Among them, ZnO whiskers are most suitable from the viewpoints of the productivity, cost, color, hygienic qualities and the like.

Figure 4:
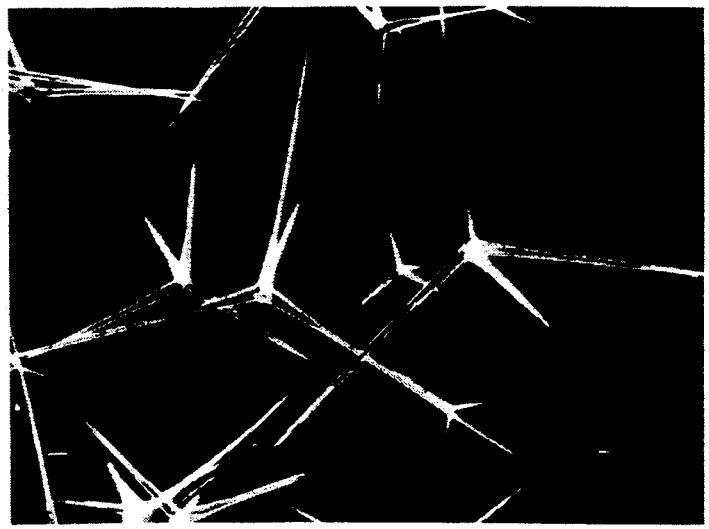
FIG. 4 is an electron microscope photograph of ZnO whisker used in the present invention.

The ZnO whisker is manufactured by various methods into a simple needle-shaped whisker or tetrapod-like whisker as is shown in an electron microscope photograph in FIG. 4. The latter tetrapod-like whisker is superior in terms of mass production, forming a resin composition with advantageous characteristics.

Although there are many ways to manufacture the tetrapod-like ZnO whisker, the following method is suitable to fulfill the semiconductor characteristics and specific resistance of the ZnO whisker as well as enabling mass-productivity. It is needless to say that the present invention is not restricted to the following method so long as the semiconductor characteristics and specific resistance of the ZnO whisker are satisfied.

Specifically, vapor of zinc metal melted at 800°-1100° C. is introduced into a furnace to react with a combustion gas such as a propane gas or the like. At this time, a reducing atmosphere of some degree is preferably used and, several seconds to several tens seconds are consumed for reaction.

Almost all of the ZnO whiskers obtained under the aforementioned conditions are like a tetrapod, with an apparent specific gravity of 0.02-0.5. Moreover, the whiskers are obtained with a high yield, not smaller than 70 wt. %, i.e., the whiskers are suited for mass production. The ZnO whiskers have electric properties, for example, semiconductor characteristics, specific resistance and the like that suit the present invention. In some cases, not only ZnO whiskers having a quadraxial crystalline part, but those with a triaxial, a biaxial or a uni-axial crystalline part may be mixed, but the triaxial, biaxial or uni-axial part is such one that is produced when the quadraxial part is partly broken. Particularly when the ZnO whiskers are kneaded into the resin, the whiskers are almost broken, resulting in a uni-axial crystalline substance.

In the present invention, a thick part at the bottom of the needle shaped crystal of the ZnO whisker is called a base thereof if the whisker is of a simple needle shape. On the other hand, in the case of the tetrapod-like crystal, a coupling part where the four needle-shaped crystals gather, is called a base thereof. The length from the base to the front edge (tip) of the ZnO whisker is preferable to be 3-300 μm, more desirably 10-200 μm to 10-50 μm from the viewpoints of the characteristics and productivity of the resin composition.

The aspect ratio (leg length/base diameter) of the ZnO whisker is preferably 3-1000, especially 5-50 so as to form the conducting path. If the length between the base and front edge is smaller than 3 μm or the aspect ratio is smaller than 3, the resultant resin composition does not become sufficiently conductive. If the length is over 300 μm or the aspect ratio exceeds 1000, the whisker is not suitable for mass production and may be broken into small parts in the kneading process because of excessively increasing the viscosity of the resin.

It is generally known that the resistivity of ZnO varies depending on the forming method thereof or whether kinds of elements are doped into the ZnO (for example, it varies from $10^{-2}$-$10^{12}$Ω.cm). $10^5$-$10^{10}$Ω.cm, particularly, $10^6$-$10^{10}$Ω.cm is applied according to the present invention. Taking into consideration the nonlinear characteristics as well, $10^7$-$10^9$Ω.cm is more suitable to realize the static dissipative resin composition having appropriate conductive properties. The resistivity of the ZnO whisker can be controlled by changing the manufacturing conditions, that is, oxygen concentration, reaction temperature and the like, or doping an element in the III group (e.g., aluminum, gallium, indium, etc.) or copper, zinc, lithium, or chromium according to a conventional manner. Aluminum or zinc is most suitable to be doped.

The specific volume resistance of the ZnO whisker is measured in the same manner as in the case of the semiconductor filler described earlier.

Although the α value, which is an index of the semiconductor characteristics of the ZnO whisker, i.e., nonlinearity of the ZnO whisker resulting from the contact between the ZnO whiskers, is not specified, 2-150, 2-100, or more particularly 2.5-40 is suitable. More restrictive 3-15 is desired. If the ZnO whisker has the α value smaller than 2, it cannot realize the static dissipative resin composition of the present invention. On the other hand, when the α value is over 150, it is difficult to achieve the desired resin composition, because of such a problem as spark discharge, etc.

The α value is measured according to the method employed for the semiconductor filler.

In a conventional ZnO nonlinear resistor called a varistor, the nonlinearity is known to be gained by the action of a special thin layer present at the boundary between the ZnO crystalline particles (for example, $Bi_2O_3$ or $Pr_2O_3$ thin layer having the thickness of the order of Å-μm). However, the nonlinearity in the present invention derives from the direct contact between the crystalline particles of the ZnO whisker, and no special thin layer composed of the other elements is intervened between the crystalline particles. Therefore, the nonlinearity of the present invention is achieved fundamentally in a quite different manner or mechanism from that of the conventional varistor.

The ZnO whisker is mixed into the resin by 20–80 wt. %, more preferably 30–70 wt. % to the whole of the resin composition. Particularly, the mixing ratio is desirably over 40 wt. % and not larger than 70 wt. %. If it is below 20 wt. %, the conducting path becomes imperfect, whereby the conductivity is insufficient for dissipation of the static electricity. When the mixing ratio exceeds 80 wt. %, the resin composition becomes fragile. When the mixing ratio is over 40 wt. %, it is particularly suitable since the ZnO whiskers are stably kept in contact with each other.

The conductivity of the resin composition having the semiconductor filler of the ZnO whisker or the like dispersed therein is measured pursuant to ASTM-D-257 (measuring voltage is suitably DC500V). The present invention aims at the resin composition having $10^5$–$10^{12} \Omega/\square$, $10^5$–$10^9 \Omega/\square$, further $10^6$–$10^9 \Omega/\square$ and more preferably $10^7$–$10^9 \Omega/\square$. The stability of the static dissipation is endangered when $10^{12} \Omega/\square$ is exceeded. Moreover, if the static dissipative property is lower than $10^5 \Omega/\square$, such inconveniences inherent in the highly conductive material as a spark discharge, a short-circuiting, an electric shock, etc. are undesirably given rise to.

The static dissipative resin composition of the present invention is used in the form of pellets, powders, molded product, paint or paste.

Besides a thermoplastic resin, a thermosetting resin can be used for the resin. Regarding the thermoplastic resin, although it is not restricted, a melt flow rate (M.F.R.) from 1 g/10 min. to 100 g/10 min., particularly, 10 g/10 min. or higher is preferred so as to make the characteristics stable. The M.F.R. is measured, for instance, according to ASTM-D-1238. In the case where the M.F.R. is lower than 1 g/10 min., the semiconductor fillers are brought into contact less with each other. If it exceeds 100 g/10 min., the resin composition becomes fragile and therefore such resin is not necessarily desirable.

Although a thermoplastic resin with high crystallinity is suitable, a non-crystalline resin may be used. Concretely, polypropylene resin, polybutylene terephthalate resin, polyacetal resin, polyphenylene sulfide resin, polyamide resin as well as polyethylene resin, polyvinyl chloride resin, polyvinylidene chloride resin, polyethylene terephthalate resin, polyether etherketone resin, liquid crystal polymer (aromatic liquid crystal polyester, semiaromatic liquid crystal polyester or the like), etc. can be used as the crystalline resin. Among these resins, polypropylene resin is best fit, but polypropylene homopolymer resin may be utilized.

For the non-crystalline resin, although it is not particularly specified, polystyrene resin, ABS resin and denatured PPE resin are most desirable, but polyether imide resin, polyether sulfide resin, polyarylate resin, polysulfone resin, polyvinyl acetate resin, polycarbonate resin, polymethyl methacrylate resin, polybutadiene resin, and polyacrylonitrile resin may be employed. It is possible to use a single kind of resin or a copolymer of two or more kinds of these resin or a mixture of the resins.

On the other hand, for the thermosetting resin, besides unsaturated polyester resin, epoxy resin, urethane resin, silicone resin, melamine resin, phenol resin, urea resin or the like can be used.

Since it requires special attention when the resin is blended or kneaded with the semiconductor filler, specific conditions (temperature, number of revolutions, viscosity and the like) should be set to allow the effective contact between the semiconductor fillers.

However, an apparatus to mix or knead this type of composite material may be a conventional one. A single-screw or multi-screw extruder, a ribbon blender, a super mixer (Henschel mixer), that is, a mixer of a container fixed type with a screw rotor blade, or a mixer of a container rotary type such as a horizontal cylindrical mixer, an inclined cylindrical mixer, or a V tumbling mixer might be employed.

Various kinds of molding methods are possible, and injection molding is most suitable in the present invention. In addition, extrusion molding, compression molding, vacuum molding, or blow molding can be carried out.

Furthermore, when the resin composition is presented in the form of paint, paste or putty, a solvent may or may not be added.

If the semiconductor filler is used after being subjected to a surface treatment, in this case, a silane coupling agent is most suitable. The other kinds of agent, for example, of chromium, titanium, silyl peroxide, organic phosphate can be used for the surface treatment.

The conductivity is improved in some cases when the semiconductor filler is used along with the conductive filler. The conductive filler should have the specific volume resistance smaller than $10^5 \Omega.cm$ and is made of metal, carbon or graphite particles, flakes, whiskers or fibers, or conductive ceramics particles, whiskers or fibers. The above metal may be preferably silver, gold, stainless or aluminum, but copper, nickel, palladium, iron, etc. may be employed.

The conductive ceramics may be conductive potassium titanate (for example, DENTALL BK-200 by Otsuka Chemical Co., Ltd.), zirconium carbide, titanium carbide, silicon carbide, etc.

The sum of the semiconductor filler and conductive filler to the whole of the resin composition should be 5–80 wt. %. Meanwhile, the weight ratio of the semiconductor filler and conductive filler is between 1:50 and 50:1, especially from 1:5 to 5:1. If the conductive filler is mixed too much, the interactive effect is reduced and proper static dissipation cannot be realized. Therefore, the ratio 1:1 to 5:1 is most desirable.

When a solid lubricant is used in the present invention, the static dissipative resin composition gains superior sliding property and abrasion resistance. Fluoride resin such as polytetrafluoroethylene, high density polyethylene, aromatic polyamide, aromatic polyester, granular phenol or graphitized substance thereof, graphite, molybdenum disulfide, tungsten disulfide, $WSe_2$, $MoSe_2$, boron nitride, etc. are suited for the solid lubricant. Two or more kinds of the above lubricant may be mixed. The lubricants are usually powder in the form of particles or flakes. From the characteristics' viewpoint, polyfluoroethylene, high density polyethylene and molybdenum disulfide are most suitable. The mixing ratio of the solid lubricant to the whole of the resin composition is 1-30 wt. %, more preferably 5-20 wt. %.

It is needless to say that it is possible to blend other kinds of material so as not to hurt the characteristics of the resin composition. For instance, reinforcing material or extender composed of glass fibers or flakes, beads, talc, mica, calcium carbonate, clay, barium sulfate, alumina, silica, diatomaceous earth, wood flour, etc. and fire-proof material such as aluminum hydroxide, antimony trioxide, phosphoric ester can be added. Or, a coloring agent such as titanium dioxide, carbon black or the like may be used. Likewise, a suitable amount of an organic antistatic agent, stabilizer or deterioration preventing agent may be blended into the resin.

Embodiment 1

Vapor of zinc metal which is melted at 980° C. is guided into a furnace to react with a burning propane gas in the reducing atmosphere. The degree of the reduction is $-0.1 \sim 10\ O_2Vol.\ \%$ which is measured by an NGK $O_2$ analyzer (model RE-110:product of Nippon Gaishi Co., Ltd.). As a consequence, tetrapod-like ZnO whiskers are obtained. The length from the base to the front edge of the whisker is 10-30 μm, and the average aspect ratio is 15. The specific volume resistance measured by the parallel plate electrodes is $2 \times 10^8 \Omega.cm$ and the α value showing the V-i characteristics measured by the electrodes is 3.9.

Thereafter, 2.5 kg polypropylene resin (Diapolymer Co., Ltd.:Mitsubishi Polypropylene BC1E, melt flow rate 3 g/10 min.) is uniformly mixed with the above-obtained 2.5 kg ZnO whiskers in a plastic bag. The mixing ratio is accordingly 50 wt. %. The mixed substance is put into a hopper of a single-screw extruder, and kneaded at the cylinder temperature 240° C. The number of revolutions of the screw at this time is 40 r.p.m. Then, the kneaded substance is extruded from a nozzle, cooled by water and cut into pellets. Each pellet of the resin composition has the average diameter 3 mmφ and the average length 5 mm.

The pellets are sent into a hopper of an injection molding press and molded at the resin temperature 220° C. and the mold temperature 52° C. A dumbbell specimen and a flat plate (85 mm × 85 mm × 3 mmt) are obtained. These molded products have superior surface smoothness and beautiful white color.

The flexural modulus and surface resistivity of the molded products is 20100 kg/cm² and $3 \times 10^6 \Omega/\square$, respectively.

Then, the flat plate is cooled in a liquid nitrogen for 30 seconds and cut by nippers. When the cut surface is inspected through an electron microscope (magnification ×1500), it is found that some of the ZnO whiskers are in touch with each other thereby to constitute a conductive path. It is also confirmed that a considerable amount of the tetrapod-like ZnO whiskers are broken into simple needle-shaped whiskers.

Embodiments 2-10

Vapor of zinc metal melted at 1020° C. is allowed to react with a propane burning gas in a furnace. The reducing atmosphere has the degree of the reduction $-4 \sim -6\ O_2Vol.\ \%$. As a result, the obtained ZnO whiskers are in the tetrapod-like shape.

With use of the ZnO whiskers and various kinds of material, kneading and molding are carried out substantially in the same manner as in the above Embodiment 1. The evaluation results of the physical properties of the final composition are indicated in Tables 1 and 2 below.

Comparative Examples 1-3

In conformity with Embodiment 1 above, comparative examples are prepared by kneading and molding various kinds of material, the physical properties of which are also shown in Table 2 below.

It is to be noted here that the resin represented in Tables 1 and 2 are respectively:
PP: Mitsubishi polypropylene by Diapolymer Co., Ltd., BC1E
PBT: Planac BT-1000S01 by Dainippon Ink & Chemicals. Inc.
Nylon 12: Diamid A1709P by Daicel-Huls Co., Ltd.
PPS: PPS M2900 by Phillips Petroleum Company
POM: Iupital (Trademark) F40-03 by Mitsubishi Gas Chemical Company Inc.
Epoxy: Mixture of 100 parts by weight of Epi-Koat #815 by Shell Kagaku Kabushiki Kaishal Co., Ltd. and 80 parts by weight of HN-2200-1 by Hitachi Kasei Kogyou Co., Ltd.

TABLE 1

| Embodiment | | 2 | 3 | 4 |
|---|---|---|---|---|
| Resin | Thermoplastic (pts. by wt.) | PP(50) | PBT(55) | Nylon 12(50) |
| | Thermosetting (pts. by wt.) | | | |
| Semicond' filler | Kind | Tetrapod ZnO whisker | Tetrapod ZnO whisker | Tetrapod ZnO whisker |
| | Pts. by wt. | (50) | (45) | (50) |
| | Vol. resistivity (Ω-.cm) | $8 \times 10^7$ | $8 \times 10^7$ | $8 \times 10^7$ |
| | α value (parallel plate electrodes) | 3.8 | 3.8 | 3.8 |
| | Aspect ratio | 5-50 | 5-50 | 5-50 |
| | Length (max.) | 10-50 μm | 10-50 μm | 10-50 μm |
| Cond' filler | Kind (pts. by wt.) | | | |
| | Maker Grade | | | |
| Solid lubricant | Kind (pts. by wt.) | | | |
| | Maker Grade | | | |
| Electrical contact | Among semicond' fillers | present | present | present |
| | Among semicond' and cond' fillers | | | |
| Surface resistance (Ω/□) | | average $2 \times 10^7$ | average $8 \times 10^6$ | average $1 \times 10^7$ |
| Discharge spark with 1000 V probe | | not present | not present | not present |
| Knead' temp' (°C.) of resin | | 240 | 260 | 300 |

TABLE 1-continued

| | | | | |
|---|---|---|---|---|
| Molding temp. (°C.) | | 220 | 240 | 250 |
| | Embodiment | 5 | 6 | 7 |
| Resin | Thermoplastic (pts. by wt.) | PPS(40) | PP(60) | POM(50)) |
| | Thermosetting (pts. by wt.) | | | |
| Semicond' filler | Kind | Tetrapod ZnO whisker | Tetrapod ZnO whisker | Tetrapod ZnO whisker |
| | Pts. by wt. | (60) | (35) | (50) |
| | Vol. resistivity ($\Omega$-.cm) | $8 \times 10^7$ | $8 \times 10^7$ | $8 \times 10^7$ |
| | $\alpha$ value (parallel plate electrodes) | 3.8 | 3.8 | 3.8 |
| | Aspect ratio | 5–50 | 5–50 | 5–50 |
| | Length (max.) | 10–50 μm | 10–50 μm | 10–50 μm |
| Cond' filler | Kind (pts. by wt.) | | CF (5) | |
| | Maker | | Mitsubishi Rayon Co., Ltd. | |
| | Grade | | TRO6NB-ZE | |
| Solid lubricant | Kind (pts. by wt.) | | | PTFE (20) |
| | Maker | | | Kitamura Co., Ltd. |
| | Grade | | | KTL610 |
| Electrical contact | Among semicond' fillers | present | present | present |
| | Among semicond' and cond' fillers | | present | |
| Surface resistance ($\Omega$/□) | | average $3 \times 10^7$ | average $2 \times 10^5$ | average $3 \times 10^8$ |
| Discharge spark with 1000 V probe | | not present | | not present |
| Knead' temp' (°C.) of resin | | 320 | 240 | 190 |
| Molding temp. (°C.) | | 300 | 220 | 180 |

TABLE 2

| | Embodiment | 8 | 9 | 10 |
|---|---|---|---|---|
| Resin | Thermoplastic (pts. by wt.) | POM(55) | | PP(30)) |
| | Thermosetting (pts. by wt.) | | epoxy(60) | |
| Semicond' filler | Kind | Tetrapod ZnO whisker | Tetrapod ZnO whisker | Granular silicon carbide |
| | Pts. by wt. | (45) | (40) | (70) |
| | Vol. resistivity ($\Omega$-.cm) | $8 \times 10^7$ | $8 \times 10^7$ | $3 \times 10^7$ |
| | $\alpha$ value (parallel plate electrodes) | 3.8 | 3.8 | 3.1 |
| | Aspect ratio | 5–50 | 5–50 | 1–4 |
| | Length (max.) | 10–50 μm | 10–50 μm | 30–50 μm |
| Cond' filler | Kind (pts. by wt.) | conductive whisker (7) | | |
| | Maker | Otsuka Chemical Co., Ltd. | | |
| | Grade | BK-200 | | |
| Solid lubricant | Kind (pts. by wt.) | MoS$_2$ (3) | | |
| | Maker | Nippon Kokuen Kogyou Co., Ltd. | | |
| | Grade | Moripowder B(5 μm) | | |
| Electrical contact | Among semicond' fillers | present | present | present |
| | Among semicond' and cond' fillers | present | | |
| Surface resistance ($\Omega$/□) | | $5 \times 10^5$ | $6 \times 10^8$ | $7 \times 10^8$ |
| Discharge spark with 1000 V probe | | | not present | not present |
| Knead' temp' (°C.) of resin | | 190 | 60 | 240 |
| Molding temp. (°C.) | | 180 | 80°C./15h. (setting condition) | 220 |

| | Embodiment | Comparative example 1 | Comparative example 2 | Comparative example 3 |
|---|---|---|---|---|
| Resin | Thermoplastic (pts. by wt.) | PP(93) | POM(70) | POM(100)) |
| | Thermosetting (pts. by wt.) | | | |
| Semicond' filler | Kind | | | |
| | Pts. by wt. | | | |
| | Vol. resistivity ($\Omega$-.cm) | | | |
| | $\alpha$ value (parallel plate electrodes) | | | |
| | Aspect ratio | | | |
| | Length (max.) | | | |
| Cond' filler | Kind (pts. by wt.) | CF (7) | conductive whisker (30) | |
| | Maker | Mitsubishi Rayon Co., Ltd. | Otsuka Chemical Co., Ltd. | |
| | Grade | TRO6NB-ZE | BK-200 | |
| Solid lubricant | Kind (pts. by wt.) | | MoS$^2$ (3) | PTFE (20) |
| | Maker | | Nippon kokuen Kogyou | Kitamura Co., Ltd. |

TABLE 2-continued

| | Grade | Co., Ltd. Mori powder B(5 μm) | KTL610 |
|---|---|---|---|
| Electrical contact | Among semicond' fillers Among semicond' and cond' fillers | | |
| Surface resistance (Ω/□) | | $3 \times 10^2$ | $3 \times 10^3$ | $1 \times 10^{15}$ |
| Discharge spark with 1000 V probe | | present | present | not present |
| Knead' temp' (°C.) of resin | | 240 | 190 | 190 |
| Molding temp. (°C.) | | 220 | 180 | 180 |

Embodiments 11–17 and Comparative Example 4

Vapor of zinc which melts at 1050° C. is fed into a furnace for reaction with a propane burning gas. At this time, the atmosphere is a slightly reducing atmosphere, the degree of the reduction of which is $-6 \sim -8$ O$_2$Vol. %. The reaction time is supposed to be approximately 20 seconds. As a result, ZnO whiskers of the tetrapod-like shape are obtained. The ZnO whisker has the length from the base to the front edge (tip) 10–20 μm and the average aspect ratio 12. The volume resistivity measured by the parallel plate electrodes is $3 \times 10^8 \Omega$.cm, while the $\alpha$ value of the V-i characteristics measured by the electrode system is 4.1.

Then, various kinds of polypropylene resin having different fluidity are prepared. Similar to Embodiment 1, ZnO whiskers and polypropylene resin are mixed (50 wt. %) and kneaded, from which a flat plate is molded.

Table 3 indicates the results. The surface resistance of the resin plate is greatly dependent on the fluidity (M.F.R.) of the mixed resin. If the resin has 1 g/10 min. or more, this resin is suitable to obtain the static dissipative resin composition. Further, if M.F.R. is increased to be not smaller than 10 g/10 min., the static dissipation is improved to not larger than $10^9 \Omega/\square$, whereby the static dissipative resin composition is stable.

As the fluidity of the resin becomes worse, that is, M.F.R. becomes decreased, an intense shearing strength as on the tetrapod-like ZnO whiskers, and therefore the tetrapod-like whiskers in three dimension are increasingly broken. Therefore, the conductive path is not formed efficiently, thereby increasing the surface resistance of the resin plate.

TABLE 3

| | Polypropylene resin (grade) | M.F.R. (g/10 min.) | Average surface resistance (Ω/□) |
|---|---|---|---|
| Embodiment 11 | Sumitomo Noblen (Trademark) AX674 | 70 | $5 \times 10^6$ |
| Embodiment 12 | Sumitomo Noblen AX574 | 45 | $7 \times 10^6$ |
| Embodiment 13 | Sumitomo Noblen AZ564 | 30 | $3 \times 10^7$ |
| Embodiment 14 | Mitsubishi polypropylene BC3 | 10 | $7 \times 10^8$ |
| Embodiment 15 | Sumitomo Noblen W531 | 8 | $3 \times 10^9$ |
| Embodiment 16 | Sumitomo Noblen H531 | 3.5 | $7 \times 10^{10}$ |
| Embodiment 17 | Sumitomo Noblen FS1012 | 1.0 | $8 \times 10^{11}$ |
| Comparative example 4 | Sumitomo Noblen FH1015 | 0.5 | $9 \times 10^{12}$ |

N.B. The mixing ratio is 50 wt. % in all cases.

Embodiment 18

Polypropylene resin (Mitsubishi polypropylene BC1E) and ZnO whiskers surface-treated by epoxy silane (A-187) are prepared. Most of the ZnO whiskers are like tetrapod, having the length from the base to the front edge (tip) 3–300 μm and the aspect ratio 5–50. The specific volume resistance is $3 \times 10^8 \Omega$.cm and the $\alpha$ value is 4.8 measured by the electrode system. The ZnO whiskers and resin are kneaded in the same manner as in Embodiment 1 and various pellets are formed by changing the mixing ratio. The cylinder temperature at this time is 230° C. and the number of revolutions of the screw is 40 r.p.m.

Figure 5:
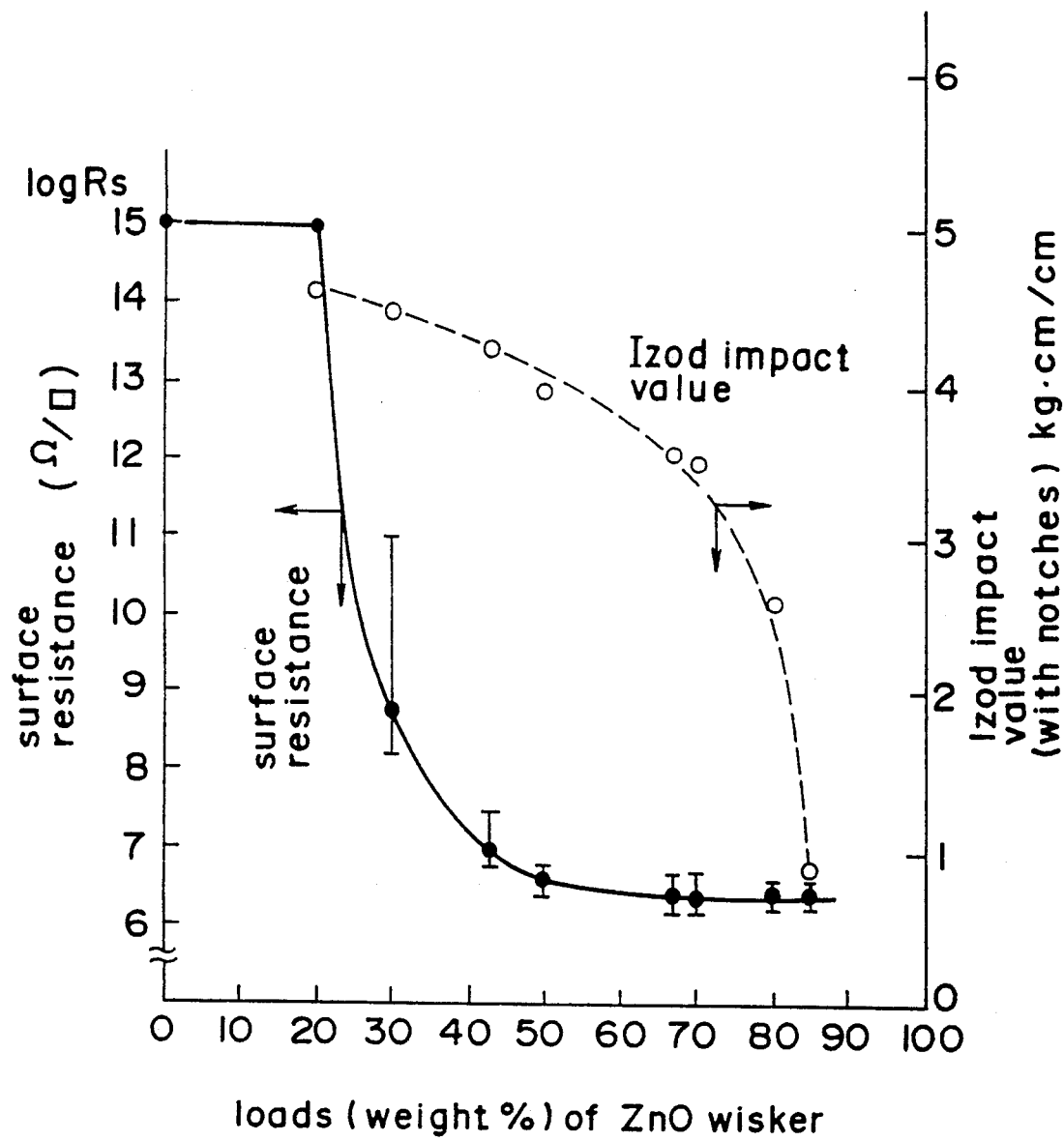
FIG. 5 is a diagram of the relation between the surface resistance and loadings of ZnO whisker in the present invention.

Then, the substance is injection molded at the resin temperature 200° C. and mold temperature 50° C., thereby obtaining a flat plate and an Izod impact test piece. The measured physical properties are shown in a diagram of FIG. 5. As is clear from FIG. 5, the static dissipative resin composition is ready when the mixing ratio is not smaller than 30 wt. %. However, the properties are still unstable, and finally stabilized when the mixing ratio exceeds 40 wt. %. On the other hand, if the mixing ratio is over 80 wet. %, the impact strength is extraordinarily decreased. Therefore, not larger than 70 wt. % is best from the viewpoint of the impact strength.

Embodiment 19

3 kg polybutylene terephthalate resin (Planac BT-1000SO1 by Dainippon Ink & Chemicals. Inc. which has 6.8 g/10 min. M.F.R. is mixed with 2 kg ZnO whiskers used in Embodiment 1. After mixing in the same manner as in Embodiment 1, the mixture is kneaded (the number of revolutions of the screw is 40 r.p.m.), thereby to mold a flat plate. At this time, the resin temperature is set at 250° C. both for kneading and for molding.

The surface resistance of the molded resin plate is considerably favorable $6 \times 10^6 \Omega/\square$, i.e., having good static dissipative properties.

Embodiment 20

Vapor of zinc metal which melts at 950° C. is fed to react with a propane burning gas in a furnace. The reducing atmosphere has the degree of the reduction $-0.1 \sim 3$ O$_2$Vol. %. Most of the ZnO whiskers are formed in the tetrapod-like shape. The average length from the base to the front edge of the whisker is 5–20 μm, and the aspect ratio varies from 5 to 50. Moreover, the specific volume resistance is $7 \times 10^7 \Omega$.cm and the $\alpha$ value indicative of the V-i characteristics is 3.3, both measured by the electrode system.

Now, the ZnO whiskers are put into urethane paint, and calmly stirred until they are sufficiently uniformly mixed. The composition is:

Chief material: 10 g Ohflex No. 800N white A by Ohashi Kagaku Kogyou Co., Ltd.

Curing agent: 2.5 g Ohflex hardener E-45 by the same 5.2 g diluent thinner No. 7400 by the same 53 g ZnO whiskers The obtained paint composition is applied uniformly onto a plate of urethane rubber, and then dried at 80° C./1 hr., whereby a coating film with the average thickness of 80 $\mu$m is formed. This film is pure white and truly beautiful, having the average surface resistance $5 \times 10^7 \Omega/\square$. Therefore, the coating film has superior static dissipative properties.

Comparative Example 51

In the Comparative example 5, conductive carbon black is used, which has the specific volume resistance $10 \Omega.cm$ and the $\alpha$ value of the V-i characteristics 1.2 measured by the same manner (DC 0–10 Volt) as in Embodiment 1. The carbon black is kneaded and molded with the same resin in the same fashion as in Embodiment 1. The mixing ratio of the carbon black is 20 wt. %. The surface resistance of the resultant molded plate is highly conductive $4 \times 10^2 \Omega/\square$. Therefore, a discharge spark takes place when the plate is brought into contact with an electrode at the application of, for example, 1000 V or more. Moreover, since a shortcircuiting or an electrification is feared even at the application of the general voltage, the resultant composition is not fit for the static dissipative material. The substance is black and impossible to be colored. Due to the small microscopical strength of the substance, a mechanical break will easily lead to drop or fall-off, or transfer of colors and smears. Therefore, the substance is not suitable particularly for use in a clean room and cannot be used as the packaging medium or holding material of ICs, liquid crystal display devices, etc.

As discussed hereinabove, the present invention provides an ideal static dissipative resin composition which could not be realized before in a conventional manner.

In other words, the resin composition of the present invention keeps relatively good insulation properties against the electricity of general voltage, while allowing the static electricity to leak well.

The present invention is applicable not only to the field of OA, FA, AV equipments, semiconductors, liquid crystal display devices, but to a wide area of technology.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A static dissipative resin composition, which comprises a resin and zinc oxide whiskers dispersed in the resin, wherein the zinc oxide whiskers each have an aspect ratio of more than 3, a length of more than 3 $\mu$m from a base to a front edge thereof, and a volume resistivity of $10^5$ to $10^{10}$ $\Omega.cm$, whereby a conductive path is formed by electrical contact of the zinc oxide whiskers with each other to dissipate static electricity from the composition.

2. A static dissipative resin composition, which comprises a resin, and zinc oxide whiskers and at least one conductive filler dispersed in the resin, wherein the zinc oxide whiskers each have an aspect ratio of more than 3, a length of more than 3 $\mu$m from a base to a front edge thereof, and a volume resistivity of $10^5$ to $10^{10}$ $\Omega.cm$, whereby a conductive path is formed by electrical contact of the zinc oxide whiskers with each other, the zinc oxide whiskers with the conductive fillers, or the conductive fillers with each other, to dissipate static electricity from the composition.

3. A static dissipative resin composition, which comprises a resin, and zinc oxide whiskers and at least one mechanical solid lubricant dispersed in the resin, wherein the zinc oxide whiskers each have an aspect ratio of more than 3, a length of more than 3 $\mu$m from a base to a front edge thereof, and a volume resistivity of $10^5$ to $10^{10}$ $\Omega.cm$, whereby a conductive path is formed by electrical contact of the zinc oxide whiskers with each other to dissipate static electricity from the composition.

4. A static dissipative resin composition, which comprises a resin, and zinc oxide whiskers, and at least one mechanical solid lubricant and at least one conductive filler dispersed in the resin, wherein the zinc oxide whiskers each have an aspect ratio of more than 3, a length of more than 3 $\mu$m from a base to a front edge thereof, and a volume resistivity of $10^5$ to $10^{10}$ $\Omega.cm$, whereby a conductive path is formed by electrical contact of the zinc oxide whiskers with each other, the zinc oxide whiskers with the conductive fillers, or the conductive fillers with each other, to dissipate static electricity from the composition.

5. A static dissipative resin composition as defined in claim 1, 2, 3 or 4, wherein each of the zinc oxide whiskers is in the form of a tetrapod.

6. A static dissipative resin composition as defined in claim 1, 2, 3 or 4, wherein the volume resistivity of each of the zinc oxide whiskers is $10^7$ to $10^9$ $\Omega.cm$.

7. A static dissipative resin composition as defined in claim 1, 2, 3 or 4, wherein the resin is thermoplastic resin.

8. A static dissipative resin composition as defined in claim 7, wherein the resin is a crystalline resin.

9. A static dissipative resin composition as defined in claim 7, wherein the resin has a melt flow rate of more than 1 g/10 min.

10. A static dissipative resin composition as defined in claim 7, wherein the resin has a melt flow rate of more than 3.5 g/10 min.

11. A static dissipative resin composition as defined in claim 7, wherein the resin has a melt flow rate of 10 to 100 g/10 min.

12. A static dissipative resin composition as defined in claim 1, 2, 3 or 4, wherein the surface resistance value of the resin composition is $10^5$ to $10^{12}$ $\Omega/\square$.

13. A static dissipative resin composition as defined in claim 1, 2, 3 or 4, wherein the surface resistance value of the resin composition is $10^5$ to $10^9$ $\Omega/\square$.

14. A static dissipative resin composition as defined in claim 1, 2, 3 or 4, wherein the amount of zinc oxide whiskers is 20 to 80 weight % based on the weight of the composition.

15. A static dissipative resin composition as defined in claim 1, 2, 3 or 4, wherein the amount of zinc oxide whiskers is more than 40% and less than 80% weight based on the weight of the composition.

16. A static dissipative resin composition as defined in claim 2 or 4, wherein the conductive filler is selected from the group consisting of particles of carbon, flakes, whiskers and fibers.

17. A static dissipative resin composition as defined in claim 3 or 4, wherein the mechanical solid lubricant is a powder selected from the group consisting of polytetrafluoroethylene, high density polyethylene, aromatic polyamide, aromatic polyester, graphite and molybdenum disulfide.

* * * * *